J. J. SQUIRE.

Fruit Jar.

No. 3,080. Reissued Aug. 11, 1868.

Witnesses:

Thos Lusk

E L Topliff

Inventor:

John J Squire

By Munn & Co attys

N. PETERS, Photo-Lithographer, Washington, D. C.

United States Patent Office.

JOHN JAY SQUIRE, OF NEW LONDON, CONNECTICUT.

*Letters Patent No.* 50,181, *dated September* 26, 1865; *reissue No.* 3,080, *dated August* 11, 1868.

IMPROVED FRUIT-JAR.

The Schedule referred to in these Letters Patent and making part of the same.

TO ALL WHOM IT MAY CONCERN:

Be it known that I, JOHN JAY SQUIRE, of New London, county of New London, in the State of Connecticut, have invented a new and useful Improvement in Fruit-Jar; and I do hereby declare the following to be a full, clear, and exact description thereof, which will enable those skilled in the art to make and use the same, reference being had to the accompanying drawing, forming part of this specification, in which drawing—

Similar letters of reference indicate corresponding parts.

Figure 1:
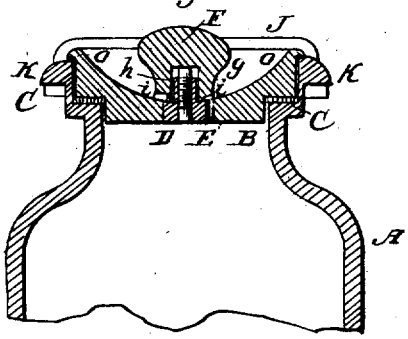
Figure 1 represents a section of the upper part of a fruit-jar, the section being taken on line *x* of fig. 2.
Figure 2:
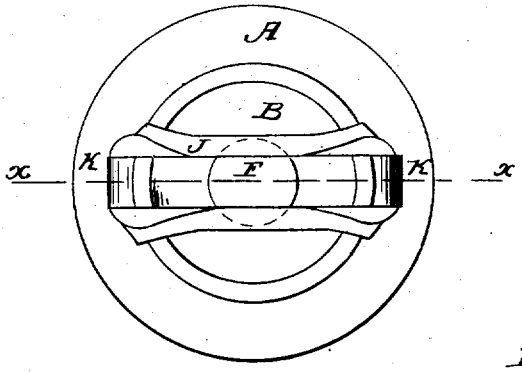
Figure 2 is a plan view.

This invention relates to jars or vessels for preserving fruit, vegetables, or other articles or liquids, and it consists, among other things, in holding their covers down by means of a strap of rubber or other elastic material, in such manner as to adapt the cover, by means of this fastening, to serve as a safety-valve for the escape of gases generated within the jars or vessels.

The letter A designates the upper part of a jar, and B its cover. The cover is hollow, so as to form a basin, and the joint which it makes within the mouth of the jar is packed by an elastic ring, C.

The cover fits within the mouth of the jar, but the rim of the cover rises above the rim of said mouth, and may be made to overlap it by a lip, O, as in this example, or the said projecting lip O may be omitted. It is important, however, that the rim of the cover rise higher than the mouth of the jar, even when the cover is brought down most snugly on the packing-ring.

The cover is held down to its place by means of an elastic band or strap of rubber, or of any other suitable material, applied to the cover, so as to confine it to the jar or bottle with a yielding power.

In this example it is shown stretched diametrically across the cover, and bent down at the ends to take hold of hooks or lugs K K, on opposite sides of the mouth of the jar, thereby securing the cover in place, and forcing it downwards upon the packing C, with the whole strength of the elastic band. This method of attaching a cover to a vessel and holding it in place, can be applied to covers of any description.

The cover B is perforated at the bottom of its basin, by a hole, D, in which is fitted a tube, *h*, that rises a little distance above the surface of the basin. Another hole, E, is made through said cover, near to the hole D, but the mouth of the hole E is level with the surface of the basin. F is a cap, so made as to control both said holes. It closes the hole D by means of a screw-plug, *g*, fitted within a recess made in the bottom of the cap, so that when, by turning the cap, the screw *g* is made to enter the tube whose interior has a screw-thread cut into it, the tube becomes covered and hidden in the annular space formed by the sides of said recess, and the outside of the screw-plug *g*, thus allowing the bottom of the cap to approach the bottom of the basin, at which time it will also close the hole E. The diameter of the bottom of the cap is to be such as to overreach the hole E, and said bottom is fitted with a packing-ring, *i*, which will fall over said hole at all times, and so insure a tight joint. Instead of closing the hole D by means of a screw-plug, it may be closed by forming a screw-thread on the outside of the tube *h*, and screwing the cap itself thereon.

The point formed on the tube is not perfectly tight, but is so formed as to let air and gas escape from beneath the cap, until the packing-ring *i* is brought down on the surface of the basin, when said ring serves not only to close the hole E, and prevent the contents of the basin from flowing into the jar, but also to prevent the escape of air and gas between the surface of the basin and the bottom of the cap.

By means of the holes D and E, and cap F, a jar which has been filled with fruit or other articles, and whose liquid contents have become lessened in volume, so as no longer to fill the jar full, may be filled up by pouring a supply of the proper liquid into the basin of the cover, and then withdrawing the cap F, when the gas or air which may be in the jar will escape through the tube *h*, and the liquid will flow into the jar through the hole E. When the jar is full, the cap is replaced. It will be observed that this operation is effected without requiring the removal of the cover B, or of the strap or fastening J. The rim of the cover B may be notched to receive the strap, and let it come flush with the rim, in which case, however, the rim should be carried up higher above the mouth of the jar than is here shown, to insure the downward pull of the strap or binder on the cover, when it is fastened on the hooks. It will be found desirable to sink the strap in the rim in the way described. When in the process of putting up fruit, &c., the jar is stood bottom side up to ascertain if it leaks, since then it will stand square and steady on its cover.

My yielding cover-fastening enables me to make the joint between the cover and the body of the vessel tight, and it also allows the escape automatically of destructive or injurious gases, when the pressure overcomes that of the atmosphere upon the cover, and the strength of the band which holds the cover down. The cover consequently becomes a safety-valve, which closes again so soon as the escaping gases have passed out, and prevents the ingress of atmospheric air.

My invention is applicable to bottles or vessels for holding effervescing-liquids or substances, such as soda, mineral-water, or cider, the fastening being adjusted to allow any excessive pressure from within to be relieved by the escape of the gas which produces it, thereby preventing the breaking of the bottles and the loss of their contents.

My invention is different in principle from that shown in the patent of J. S. and T. B. Atterbury, dated June 30, 1863, where the whole joint between the cover and jar is covered by the fastening in such a manner as to prevent the escape of gases from within, unless the fastening is displaced or removed; I therefore disclaim the invention described in that patent.

Having thus described my invention, what I claim as new, and desire to secure by Letters Patent, is—

1. Closing the vent-hole D and supply-hole E of the cover of a jar, by means of a cap, F, substantially as described.

2. I also claim holding the covers of jars or vessels in place, by means of elastic bands or straps, or their equivalents, applied substantially as shown and described.

JOHN J. SQUIRE.

Witnesses:

W. HAUFF,

E. F. KASTENHUBER.